Oct. 29, 1963   G. A. TINNERMAN   3,108,297
APPARATUS FOR MAKING NUTS HAVING WIRE CLIPS
Original Filed Nov. 17, 1958   3 Sheets-Sheet 1
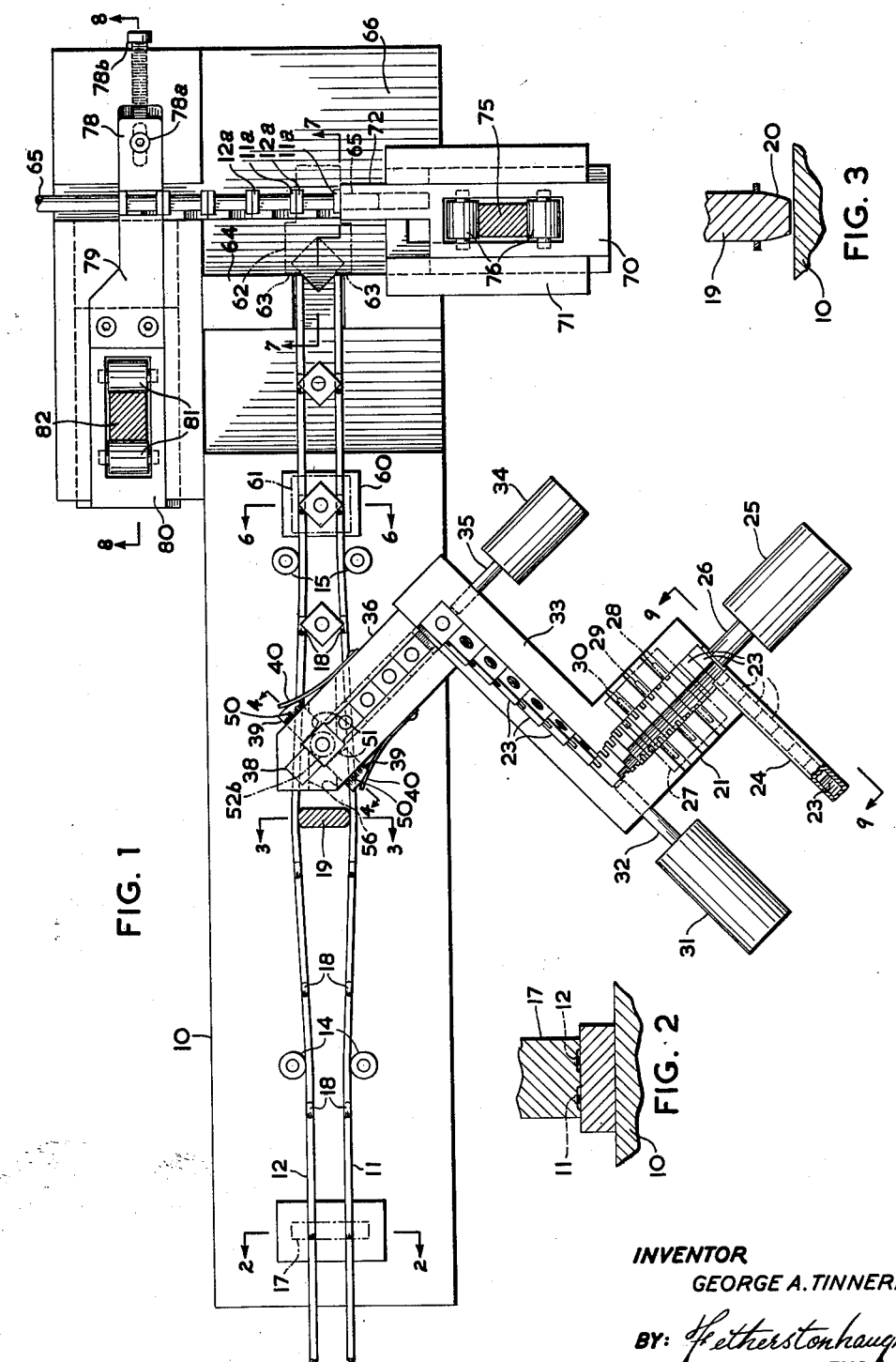
INVENTOR
GEORGE A. TINNERMAN
BY: Fetherstonhaugh & Co.
ATTORNEYS

INVENTOR
GEORGE A. TINNERMAN

Oct. 29, 1963 G. A. TINNERMAN 3,108,297
APPARATUS FOR MAKING NUTS HAVING WIRE CLIPS
Original Filed Nov. 17, 1958 3 Sheets-Sheet 3

INVENTOR
GEORGE A. TINNERMAN
BY: *Featherstonhaugh & Co!*
ATTORNEYS 3,108,297
APPARATUS FOR MAKING NUTS HAVING
WIRE CLIPS
George A. Tinnerman, 17864 Beach Road,
Lakewood 7, Ohio
Continuation of application Ser. No. 774,543, Nov. 17, 1958. This application Mar. 31, 1961, Ser. No. 120,807
6 Claims. (Cl. 10—72)

This invention relates to an apparatus for producing nuts having U-shaped mounting clips fixed thereto, and is a continuation of application Serial No. 774,543, filed November 17, 1958, now abandoned.

In assembly work there are often instances, especially in blind locations, where it is very difficult for the operator to hold a nut while the bolt is being inserted and thereafter hold the nut against rotation when the bolt is being tightened. To overcome this difficulty it has previously been proposed to provide the nut with means for firmly positioning it for the reception of a bolt, the positioning means comprising U-shaped mounting clips which are attached to the bolt and arranged to be readily clipped or fastened to one of the parts which are to be joined by the bolt.

While the advantages of having such nuts provided with U-shaped mounting clips has been appreciated for some years, widespread adoption of these nuts has been handicapped for economic reasons since they have been expensive to manufacture.

My present contribution to the art is an apparatus for continuously mass producing nuts having U-shaped mounting clips fixed in slots cut in two opposite edges of the nut.

This apparatus may be generally defined as comprising a bed, means for feeding two wires longitudinally of said bed, means for serially feeding nuts having slotted edges to said bed at a point between the two wires being fed therealong, means for causing said wires to enter the slotted edges of nuts serially fed thereto, whereby said nuts will be serially carried by said wires longitudinally of said bed, a punch carrying member reciprocably mounted above said bed, means for reciprocating said member towards and away from said bed, means mounted on said bed to co-operate with said punch carrying member for serially swaging the slotted edges of each nut, for cutting each wire on one side of each nut, for forming the wire lengths on the other side of each nut into U-shaped formations and for transporting the product thus formed away from said bed.

The presently preferred apparatus includes, as an integral part of the apparatus, mechanism for forming the slots in the nuts and delivering the slotted nuts to the bed. This mechanism comprises a channel arranged to support the nuts in vertical disposition with the edges which are to be slotted at opposite sides of the channel, means intermittently moving the nuts serially along the channel, a slotting punch carried by said punch carrying member above said channel, said slotting punch having a series of oppositely disposed pairs of cutters arranged to cut progressively deeper slots in the nuts as they are intermittently moved along said channel, at least one additional channel, and intermittently operated pushing means for serially driving the slotted nuts along said additional channel to said point on said bed, said additional channel also serving to translate the slotted nuts from vertical to horizontal dispositions.

In the drawings which illustrate one presently preferred embodiment of the invention, FIGURE 1 is a top plan view of the apparatus with the punch carrying element removed.

FIGURE 2 is a cross-section taken on the line 2—2 in FIGURE 1, showing an embossing punch.

FIGURE 3 is a cross-section taken on the line 3—3 in FIGURE 1, showing the wire spreading mechanism.

In FIGURE 1, 10 indicates the stationary bed of the apparatus, along which two wires 11 and 12 are fed by means of feed rolls (not shown), the wires being guided by two pairs of rollers 14 and 15.

Figure 12:
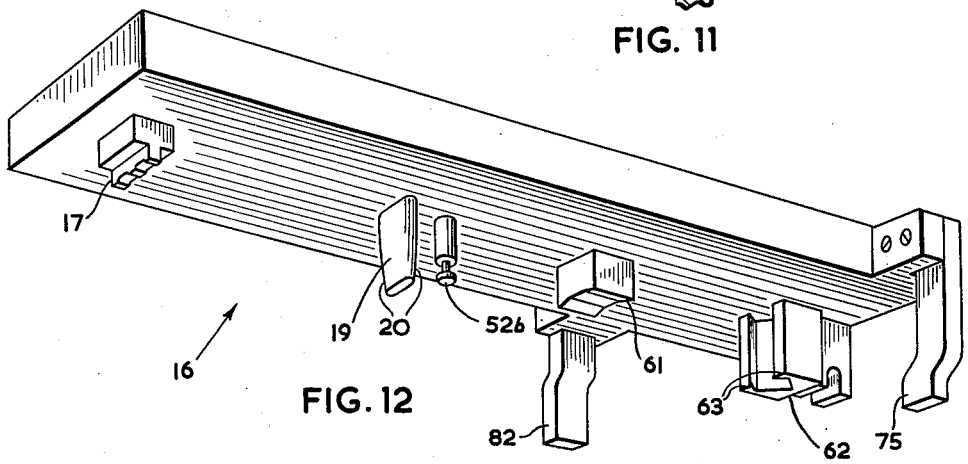
FIGURE 12 is a perspective view of the punch carrying member.

Mounted for reciprocation in a vertical plane above the bed 10 is a punch carrying member 16 which is shown in FIGURE 12. This punch carrying member 16 carries a plurality of elements designed to shape, spread, punch and cut the wires 11 and 12 being fed along the bed 10. The first of these members is an embossing punch which appears at the left hand side of FIGURE 1 and is illustrated in FIGURE 2. At the lowermost point of travel of the member 16, the embossing punch 17 strikes each of the wires 11 and 12 to flatten them as indicated at 18. Since the wires are being fed longitudinally of the bed and the punch is being reciprocated, this flattening will only be effected at spaced intervals along each length of wire.

The punch carrying member 16 is also provided with a wire spreading means 19 whose lower end is tapered, indicated at 20 in FIGURE 3. Thus with each reciprocation of the punch carrying member 16 the wires are gradually spread apart by means of the spreading means 19 and then permitted to move back inward toward one another.

Means are provided for feeding slotted nuts to the bed and depositing them serially between the spread apart wires with the slots in the nuts suitably located for introduction of the wires 11 and 12 in the slots in the nuts. Associated with this nut feeding mechanism is a mechanism for cutting the slots in the nuts. These two mechanisms will now be described in detail in reference to the illustrated apparatus which has been especially designed to produce nuts wherein the slots for the mounting of the two U-shaped clips are cut in the edges of two opposite corners of the nuts.

To one side of the bed 10, at a point substantially midway along the bed, there is located a block 21 provided with a V-shaped channel 22 designed to support nuts 23 face to face in vertical disposition in the V-shaped channel, with the corners of the nuts which are to be slotted disposed at opposite sides of the channel. A feed track 24 is provided for gravity feeding of the nuts, one at a time to the channel 22. A further nut feeding means which may be actuated in any suitable manner, here shown as an air cylinder 25, is provided having a piston 26 located for reciprocation longitudinally of the slot 22, the reciprocation on the piston 26 serving to intermittently push the nuts along the channel 22 a distance which, with each reciprocation of the piston 26, is equal to the width of one nut. The withdrawal of the piston, away from the channel 22 allows, with each reciprocation of the piston, a fresh nut to drop into the channel 22. The frequency of reciprocation of the piston 26 is governed by the frequency of reciprocation of the punch carrying member 16, by means of suitable electro-mechanical linkage between the member 16 and the means for actuating the piston. This link preferably includes a micro-switch mounted on the member 16.

Figure 9:
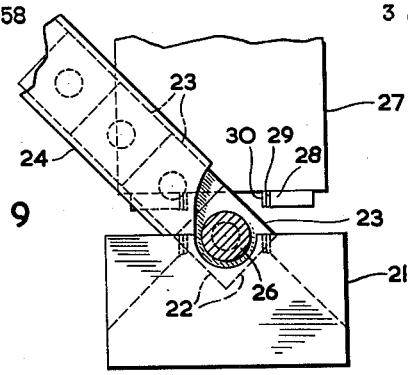
FIGURE 9 is a cross-sectional view on an enlarged scale, taken along the line 9—9 in FIGURE 1 and illustrating the cutting of the slots in the opposite corners of each nut.

The punch carrying member 16 carries a slotting punch 27, best shown in FIGURE 9. Slotting punch 27 carries three pairs of cutting members, 28, 29 and 30 which are each spaced apart from one another a distance equal to the thickness of two nuts. The cutting members are located on opposite sides of the longitudinal axis of the channel 22 and the pairs of cutting elements are located progressively closer to one another so as to cut progressively deeper slots in the nuts as they are intermittently moved along the channel 22. It will be understood, of course, that slotting in some cases might be achieved by one punching operation.

As the slotted nuts leave the channel 22 they are, by means of an air cylinder 31, having a reciprocating piston 32 (whose frequency of reciprocation is also governed by the frequency of reciprocation of member 16), caused to move in series along a channel 33 which is sloped so as to gradually translate the nuts from a vertical to a horizontal disposition. A third air cylinder 34, having a reciprocating piston 35 which is similarly governed as to frequency of reciprocation, is employed to direct the horizontally disposed nut along a guideway 36 leading to the bed 10 at a point forward of the spreader 19 and above the horizontal wires 11 and 12 being fed along said bed. The guideway 36 serially carries each nut to a position at the end of the guideway where each nut is suitably held such as by a magnet 38 and by two slidable gripping elements 39 which are capable of sliding motion transversely of the guideway 36 and are normally urged towards one another by means of leaf springs 40 attached at one end to the outer walls of the guideway 36 with their free ends bearing against the slidable elements 39. The slidable elements 39 are each provided with a stop element 50 to limit their inward movement toward one another under the influence of the leaf springs 40. The gripping faces 51 of the slidable elements 39 are somewhat curved, as best seen in FIGURE 1, to facilitate entry of a nut between the gripping faces 51.

The punch carrying member 16 also carries a cylindrical member 52 having a bore 52a and plunger 52b mounted within said bore and retractable into the bore against the action of a compression spring 52c. As the plunger 52b begins its downward travel during each vertical reciprocation of the punch carrying member 16 it contacts the nut 23 which is held between the gripping elements 39, and, as the plunger 52b moves further downward, it carries the nut 23 with it, having overcome the gripping actions of the elements 39 and the magnet 38. The plunger 52b carries the nut (which it has thus released), into a well 54 formed in a block 55 which is located on the bed 10 at a point somewhat forward of the point where the wires 11 and 12 are spread apart by the member 19 as they are fed along the bed. Wire accommodating slots 56 are provided in the block 55 to permit alignment of wires 11 and 12 with the slots cut in the opposite corners of the nut 23 which has been carried by the plunger 52b to the base of the well 54.

As the punch carrying member 16 retreats vertically upwardly during each stroke of its reciprocation, the spreading member 19 is carried upwardly permitting the wires to move inwardly toward one another under the influence of the rollers 14 and 15. Upward withdrawal of the plunger member 52b is, however, delayed because of the fact that the spring 52c associated with the plunger member 52b was compressed as the plunger member was moved downwardly. This action of the spring 52c serves to hold the nut 23 firmly at the base of the well 54 while the wires 11 and 12 move inwardly toward one another to enter the slots in the nut.

As the wires 11 and 12 enter the slots, the action of the spring is expended by the punch carrying member 16 lifting the plunger 52c clear of the nut 23. The rate of feed of the wires along the bed is so governed in relation to the reciprocation of the punch carrying member 16 that two embossed portions 18 on the wires 11 and 12 will enter the slots in the nut 23 as the plunger 52b is withdrawn out of contact with the nut. The nut 23 which has been thus inserted between the wires 11 and 12, is carried away from the block 55 by the wires 11 and 12, the embossing 18 serving to prevent slipping of the nut relative to the wires.

Figure 4:
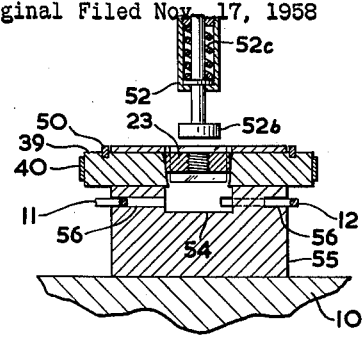
FIGURES 4 and 5 are cross sections on an enlarged scale, both taken on the line 4—4 in FIGURE 1, showing the means for causing the wires to enter the slotted corner of the nuts.
Figure 5:
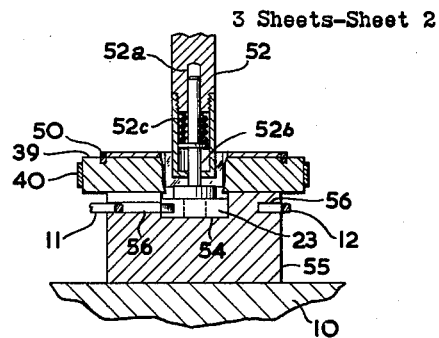
Figure 6:
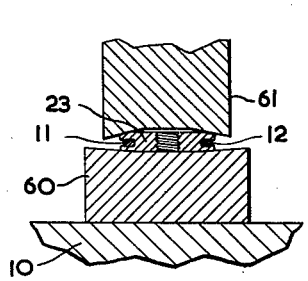
FIGURE 6 is a cross-section taken along the line 6—6 in FIGURE 1, also on an enlarged scale, showing the means for swaging the slotted edges of the nuts.

Each nut which has thus been received between the wires is led over an anvil 60, best seen in FIGURE 6. The punch carrying member 16 carries, in vertical alignment with the anvil 60, a swaging punch 61 which is shaped to swage the oppositely located slotted corners of the nut, thus firmly securing the nut to the wires 11 and 12.

Figure 7:
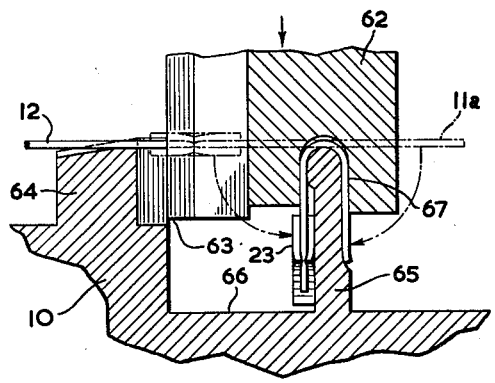
FIGURE 7 is a cross-sectional view on an enlarged scale, taken along the cranked line 7—7 in FIGURE 1, and showing the means for severing the wires and bending the cut-off lengths into U-shaped formations.

With further feeding of the wires 11 and 12 along the bed 10, the swaging nuts are each serially carried to a position below a third punch 62 which is carried by the punch carrying member 16. The punch 62 has shearing edges 63 (see FIGURES 1 and 7) arranged to co-operate with a shearing block 64 mounted upon the bed 10. As the shearing edges 63 sweep past the shearing block 64 they act to cut each of the wires 11 and 12 at points just aft of the nut which has been brought below the punch 62. A vertical bar 65 is located in a well 66 (see FIGURE 7) in the bed 10 and extends transversely across the bed at a point below the punch 62. As the punch 62 is carried further downward after shearing the wires 11 and 12, the remaining lengths of wire 11a and 12a extending forwardly from the nut are bent, using the bar 65 as an anvil, into U-shaped formations by means of a U-shaped forming recess 67 located in the base of the punch 62 in vertical alignment with the transversely extending bar 65.

Figure 8:
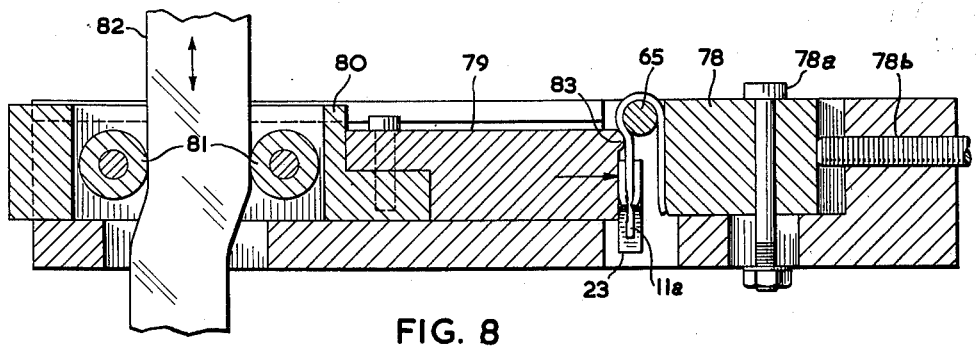
FIGURE 8 is a cross-sectional view on an enlarged scale, taken along the line 8—8 in FIGURE 1.

A carriage 70 is transversely slidably mounted upon a guideway 71 mounted upon the bed 10, to one side of, but in alignment with, the transversely extending bar 65. A pusher element 72 extends from the carriage 70, and telescopically receives one end of the bar 65. A cam element 75 is rigidly secured to the punch carrying member 16 with its lower end located between two rollers 76 rotatably mounted within the body of the carriage 70. The lower end of the cam 70 is shaped to cause reciprocation of the carriage 70 transversely of the bed 10 as the member 16 is reciprocated vertically with respect to the bed. This transverse reciprocation of the carriage 70 causes the pusher element 72 to intermittently push the U-shaped members along the bar 65 so that they are forced towards the side of the bed opposite the carriage 70. The bar 65, on the side of the bed opposite the carriage 70, has a cylindrical cross section, as shown in FIGURE 8, instead of the cross-section illustrated in FIGURE 7, which section is only required in the region of the bar intended to co-operate with the recess 67 in the punch 62.

As the members 11a and 12a are intermittently forced along the bar 65 they are brought into alignment with an anvil 78 adjustably mounted upon the bed 10 by means of bolts 78a and 78b. A ram 79 is mounted on the bed 10 in alignment with the anvil 78 (see FIGURE 8) and is reciprocable toward and away from the anvil 78 by means of a carriage 80 having rotatable rollers 81 between which is located a cam 82 which is carried by the punch carrying member 16. The cam 82 reciprocates the carriage 80 toward and away from the anvil 78, in the plane of the bed 10, as the punch carrying member 16 is reciprocated vertically toward and away from the bed 10. The ram 79, carries, on its working face, a protrusion 83 which co-operates with the transverse bar 65 and the anvil 78 to deform each of the members 11a and 12a so as to narrow the gap between the arms of each of the U-formations for a portion of their lengths measured inwardly from the mouth of each U-formation. Once this operation has been completed the finished products are serially pushed off the end of the bar 65, whence they fall into a receiving hopper (not shown).

Figure 10:
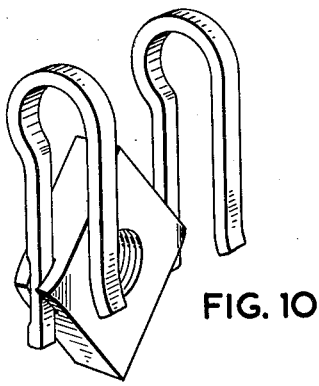
FIGURE 10 is a perspective view of the product produced with the apparatus of the invention.
Figure 11:
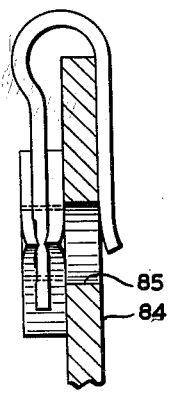
FIGURE 11 shows one of the products of the invention mounted, in alignment with a bolt hole, on a part requiring bolting.

FIGURE 10 shows one finished product mass-produced by the apparatus according to the invention, while FIGURE 11 shows the product mounted upon a plate 84 with the threaded bore in the nut in alignment with a bolt or stud receiving bore 85 in the plate and with the U-shaped gripping members holding the nut in this desired position of alignment.

What I claim as my invention is:

1. An apparatus for producing nuts having lengths of wire forming clips firmly secured thereto, said apparatus comprising a bed, means for feeding two wires longitudinally of said bed in spaced apart parallel relationship, means for serially feeding nuts, having a pair of slotted edges to said bed at a point between the two wires being fed therealong, means for causing one of said wires to enter one of the pair of slotted edges of said nuts and the other of said wires to enter the other of the pair of slotted edges of said nuts, said wires thereby forming a conveyor for serially carrying said nuts longitudinally of said bed and supporting said nut on each side of each nut, a punch carrying member reciprocally mounted above said bed, means for reciprocating said punch carrying member toward and away from the bed, means mounted on said bed to co-operate with said punch carrying member for serially swaging the slotted edges of each nut to permanently secure said nuts on said wires and means for cutting and bending the wires to provide wire clips for each nut.

2. An apparatus as defined in claim 1, in which said punch carrying means carries the means for cutting each wire on one side of each nut.

3. An apparatus as defined in claim 1, in which said punch carrying means carries means for serially spreading said wires in their course of travel along said bed as they approach said point where said nuts are fed to said bed.

4. Apparatus as claimed in claim 3 in which said spreading means is a bar which depends vertically from said punch carrying means and is tapered inwardly at its lower end.

5. An apparatus as claimed in claim 1 in which said punch carrying means carries a spring loaded plunger for serially directing each nut from the nut feeding means to a position in which the wires can be introduced into the slots in the nuts.

6. An apparatus for producing nuts having wires firmly attached thereto forming clips for the nuts, the apparatus comprising a bed, means for intermittently feeding two continuous wires which are flattened at spaced intervals therealong, said wires being longitudinally of said bed in spaced apart parallel relationship, means for serially feeding nuts having opposed slotted edges between the wires of said conveyor with a slot therefor in registry with a flattened portion of each wire, means for periodically spreading said resilient conveyor wires apart from one another a distance greater than the span of the slotted edges of said nuts and for releasing said spread wires to cause the flattened portion of each wire to enter the adjacent slot on the nut and thus serially mounting said nuts between the wires so that the wires form a conveyor for the nuts, means for serially swaging the slotted edges of said mounted nut ends to permanently secure said nuts on said wires and means for cutting and bending the wires for forming wire clips for each nut.

References Cited in the file of this patent
UNITED STATES PATENTS
2,116,547     Sundback  ---------------  May 10, 1938